United States Patent Office 3,234,808
Patented Feb. 15, 1966

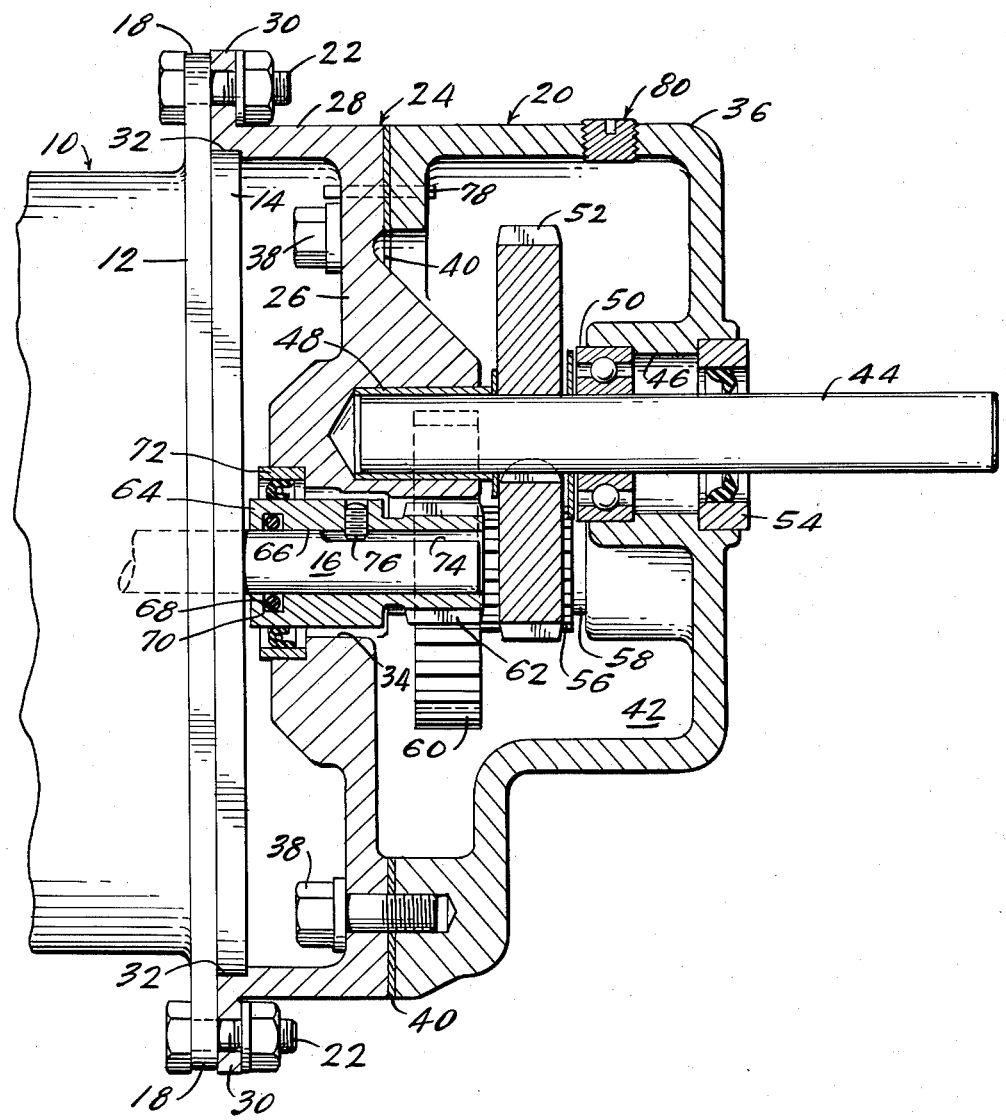

3,234,808
CLOSE COUPLED MOTOR DRIVEN GEAR
REDUCING UNIT
Harold E. Nelson, 1950 Potomac Drive, Toledo 7, Ohio
Filed Jan. 27, 1964, Ser. No. 340,224
3 Claims. (Cl. 74—421)

The present invention relates to gear reducing mechanisms which are attached directly to the end of drive mechanisms; and more particularly to gear reducers which are adapted to be mounted directly to the end plates of electric motors.

Many electric motors, and particularly fractional horsepower electric motors, are made with standard end mounting plates having standard bolting arrangements and a cylindrical abutment surface that is machined concentric with a shaft of standard size and projection. These motors are made by many different manufacturers and the motor of one manufacturer is interchangeable with one of another manufacturer.

There have been produced heretofore close coupled gear reducing units having oil-tight gear reducing sections which are bolted directly to one of the abovementioned standard electric motors. The housings of these gear reducing sections have oil-tight end walls having a small opening through which the shaft of the motor extends into a gear chamber. These housings are made in sections, and after the oil-tight end wall is mounted on the motor with the shaft extending into the chamber, a gear is insalled on the motor shaft, and the remainder of the gear reducing section is thereafter bolted onto the oil-tight end wall. Whenever a motor on one of the above described close coupled gear reducing units burns out or becomes defective, it is necessary to send the entire unit to a shop and the gear reducing section taken apart to disconnect the structure attached to the motor shaft to allow the motor shaft to be withdrawn from the housing.

An object of the present invention is the provision of a new and improved close coupled gear reducing unit which is so constructed that the motor on which the gear reducing section is mounted can be removed without disassembly of the housing of the gear reducing section.

Another object of the invention is the provision of a new and improved close coupled gear reducing unit in which a gear of the gear reducing section is journaled by the shaft of the motor and in which the gear reducing section can be installed and removed from the motor without disassembly of the housing of the gear reducing section while at the same time providing an oil-tight seal with respect to the shaft of the motor.

The invention resides in certain constructions, and combinations and arrangements of parts; and further objects and advantages will become apparent to those skilled in the art to which the invention relates from the following description of a preferred embodiment described with reference to the acocmpanying drawing forming a part of this specification, and in which:

The solitary figure of the drawing is a central vertical sectional view of a preferred embodiment of gear reducing unit attached to an electric motor having a standard end plate, and in which the motor is shown in side elevation.

The electric motor 10 shown in the drawing has a standard end plate 12 which has a cylindrically shaped centering abutment surface 14 of standard diameter which is concentric with a shaft 16 of standard diameter and standard projection from the end plate. The motor also includes a bolting flange 18, the bolt holes of which have a standard pattern.

The gear reducing section 20 which is attached to the motor 10 by bolts 22 comprises, a cup-shaped backplate 24 having an oil-tight wall 26 which is positioned opposite the end plate 12, and generally cylindrically shaped sidewalls 28 which end in a flange 30 bolted to the bolting flange 18. The sidewalls 28 have an inner cylindrical abutment surface 32 which engages the abutment surface 14 and centers the backplate 24 with respect to the end plate 12. The wall 26 has an opening 34 therethrough which is concentric with the abutment surface 32. The body of the gear reducing section 20 is completed by a gear housing 36 which is secured to the opposite side of the backplate 24 by machine screws 38 and a gasket 40 to form a gear chamber 42.

The gear reducing section 20 has an output shaft 44 which projects out of an opening 46 in the gear housing 36. The inner end of the output shaft 44 is a journaled in a sleeve bearing 48, and the outer end of the shaft 44 is journaled in an antifriction bearing 50 pressed into the opening 46. A gear 52 is keyed to the output shaft 44 between bearings 48 and 50, and an oil seal is pressed into the outer end of the opening 46 to provide a seal relative to the shaft 44. The gear 52 is rotated by a gear 56 keyed to an intermediate shaft 58, opposite ends of which are journaled in the backplate 24 and gear housing 36. Another gear 60 is keyed to the intermediate shaft 58, and gear 60 is adapted to be driven by structure about to be described.

According to the invention, gear 60 is arranged to be driven by a pinion drive gear 62 which is small enough to pass through the opening 34. The drive gear 62 has an axially extending tubular projection 64 which has an outer diameter at least as great as that of the gear 62 and which is adapted to extend through the opening 34 when gear 62 meshes with gear 60. In the form shown in the drawing the projection 64 is integral with the drive pinion, but it will be readily apparent that two separate elements may be used.

The tubular projection 64 and gear 62 are provided with an axially extending opening 66 into which the shaft 16 projects. Although the opening 66 can be a blind hole closed off at the gear 62, it is shown as extending through the gear 62, and an O-ring seal 68 is seated in a groove 70 to effect a seal with the shaft 16. An oil seal 72 is pressed into the opening 34 in the oil-tight wall 26, and provides an oil-tight seal with respect to the exterior of the tubular projection 64. Although the end of the shaft 16 and gear 62 can be provided with keyways and a key installed therein to provide a driving connection, the shaft 16 is shown as provided with a flat 74 milled thereon, and a driving connection is provided between the shaft 16 and gear 62 by a set screw 76 which is threaded through the sidewalls of the tubular projection 64 and bears against the flat 74. The set screw is within the space protected by seal 68, so that any oil leakage past the set screw does not escape out of the gear chamber 42 past seal 68.

The closed coupled unit shown in the drawing is assembled by placing the gearing and shafts 44 and 58 in position in the gear housing 36, and fastening the cup-shaped backplate 24 to the gear housing 36 by the machine screws 38. Proper alignment of the gears and bearings is assured by a dowel pin 78. Thereafter, the gear 62 and tubular projection 64 having a seal 68 in the groove 70 is positioned on the end of the motor shaft 16 and the set screw 76 is tightened down upon the shaft to provide a driving connection and prevent the removal of gear 62 from the shaft. A seal 72 is pressed into the opening 34, and the gear 62, now carried by the shaft 16 is slipped through the seal 72 until the cylindrical abutment surface 32 engages the cylindrical abutment surface 14 of the motor and the flange 30 aligns with and engages the bolting flange 18. Thereafter, bolts 22 may be tightened in position and oil is added to the gear chamber 42 through a filling opening 80.

If the motor 10 should burn out or become otherwise impaired, the bolts 22 are removed and the gear 62 and tubular projection 64 are withdrawn through the seal 72 as the motor 10 is separated from the gear reducing section 20. The set screw 76 is then loosened, the gear 62 and tubular extension installed upon another standard motor and the new motor and gear 62 is installed in position in the gear reducing unit 20 without disassambling the gear reducing section 20.

While the invention has been described in considerable detail, it is not intended to be limited to the particular embodiment shown and described, and it is intended to cover hereby all novel adaptations, modifications, and arrangements thereof which come within the practice of those skilled in the art to which the invention relates.

What I claim is:

1. A gear reducing unit for attachment to the end plate of a motor having an axially extending shaft projecting therefrom, and generally radially outwardly facing abutment surfaces spaced concentrically with respect to said shaft, said unit comprising: a generally cup-shaped backplate having an end wall with an opening therethrough that is larger than the shaft of the motor and through which the shaft is adapted to extend, said generally cup-shaped backplate having sidewall portions with abutment surfaces concentric with said opening for centering said opening over the shaft when said abutment surfaces of said backplate are in engagement with the abutment surfaces of the motor, a drive gear smaller than said opening, said drive gear having an axially extending tubular projection on one side thereof having an outer diameter at least as great as the outer diameter of said gear, said tubular projection being adapted to project through said opening and having an axially extending internal opening adapted to receive the shaft of said motor, means for preventing the passage of oil through said opening of said tubular projection when installed on the shaft, drive means for establishing a driving connection between said drive gear and the motor shaft, means for establishing an oil seal between said tubular projection and the sidewalls of said opening in said backplate, an oil retaining housing positioned on the side of said generally cup-shaped backplate opposite said abutment surfaces thereon, an output shaft carried by said housing, and gearing supported by said unit in a position to mesh with said drive gear and rotatably drive said output shaft.

2. A gear reducing unit for attachment to the end plate of a motor having an axially extending shaft projecting therefrom, and generally radially outwardly facing abutment surfaces spaced concentrically with respect to said shaft, said unit comprising: a generally cup-shaped backplate having an end wall with an opening therethrough that is larger than the shaft of the motor and through which the shaft is adapted to extend, said generally cup-shaped blackplate having sidewall portions with abutment surfaces concentric with said opening for centering said opening over the shaft when said abutment surfaces of said backplate are in engagement with the abutment surfaces of the motor, a drive gear smaller than said opening, said drive gear having an axially extending tubular projection on one side thereof having an outer diameter at least as great as the outer diameter of said gear, said tubular projection being adapted to project through said opening and said tubular projection and said gear having an axially extending internal opening therethrough adapted to receive the shaft of said motor, drive means for establishing a driving connection between said drive gear and the motor shaft, sealing means positioned on the opposite side of said drive means from said drive gear for effecting an oil-tight seal between said tubular projection and the shaft of the motor, means for establishing an oil seal between said tubular projection and the sidewalls of said opening in said backplate, an oil retaining housing positioned on the side of said generally cup-shaped backplate opposite said abutment surfaces thereon, an output shaft carried by said housing, and gearing supported by said unit in a position to mesh with said drive gear and rotatably drive said output shaft.

3. A gear reducing unit for attachment to the end plate of a motor having an axially extending shaft projecting therefrom, and generally radially outwardly facing abutment surfaces spaced concentrically with respect to said shaft, said unit comprising: a generally cup-shaped backplate having an end wall with an opening therethrough that is larger than the shaft of the motor and through which the shaft is adapted to extend, said generally cup-shaped backplate having sidewall portions with abutment surfaces concentric with said opening for centering said opening over the shaft when said abutment surfaces of said backplate are in engagement with the abutment surfaces of the motor, a drive gear smaller than said opening, said drive gear having an axially extending tubular projection on one side thereof having an outer diameter at least as great as the outer diameter of said gear, said tubular projection being adapted to project through said opening and said tubular projection and said gear having an axially extending internal opening therethrough adapted to receive the shaft of said motor, a set screw carried in the sidewalls of said tubular projection adjacent said drive gear for establishing a driving connection with the shaft, an O-ring carried in the sidewalls of said axially extending opening of said tubular projection on the opposite side of said set screw from said drive gear, means for establishing an oil seal between said tubular projection and the sidewalls of said opening in said backplate, an oil retaining housing positioned on the side of said generally cup-shaped backplate opposite said abutment surfaces thereon, an output shaft carried by said housing and gearing supported by said unit in a position to mesh with said drive gear and rotatably drive said output shaft.

References Cited by the Examiner

UNITED STATES PATENTS

| | | | |
|---|---|---|---|
| 2,888,831 | 6/1959 | Malcom | 74—421 |
| 3,001,409 | 9/1961 | Fumetti | 74—606 XR |

DON A. WAITE, *Primary Examiner.*

L. H. GERIN, *Assistant Examiner.*